United States Patent [19]

Belanger et al.

[11] Patent Number: 4,985,957
[45] Date of Patent: Jan. 22, 1991

[54] WHEEL WASHING APPARATUS AND METHOD

[75] Inventors: Michael J. Belanger, Walled Lake; Graham J. Astley, Novi, both of Mich.

[73] Assignee: Belanger, Inc., Northville, Mich.

[21] Appl. No.: 464,338

[22] Filed: Jan. 12, 1990

[51] Int. Cl.⁵ ............................................. B60S 3/06
[52] U.S. Cl. .................................. 15/53.3; 15/DIG. 2; 134/45; 134/123; 239/562; 239/566; 239/752
[58] Field of Search .................. 15/53 B, DIG. 2; 134/45, 123; 239/562, 566, 752

[56] References Cited

U.S. PATENT DOCUMENTS

| | | |
|---|---|---|
| 2,716,772 | 9/1955 | Cockrell . |
| 2,857,921 | 10/1958 | Hurst . |
| 3,191,207 | 6/1965 | VanBrakel . |
| 3,517,405 | 6/1970 | Hanna et al. ............ 15/53 B |
| 3,628,212 | 12/1971 | Van Brakel ............... 15/53 B |
| 3,667,486 | 6/1972 | Cole et al. . |
| 3,670,743 | 6/1972 | Moore . |
| 4,023,228 | 5/1977 | Hanna ....................... 15/53 B |
| 4,550,464 | 11/1985 | Messing . |
| 4,679,134 | 7/1972 | Nixon . |
| 4,830,033 | 5/1989 | Hanna . |

Primary Examiner—Edward L. Roberts
Attorney, Agent, or Firm—Brooks & Kushman

[57] ABSTRACT

The apparatus and method is utilized in a drive-through vehicle washing system of the type in which a vehicle is moved by conveyor along a longitudinal path across a floor surface, past a series of washing stations. The apparatus attaches to a parallelogram linkage such as that of a tire washing station and includes a manifold for spraying pressurized liquid at the vehicle wheels from an outlet nozzle. The manifold is carried by a drive mechanism which translates the manifold longitudinally to follow the vehicle wheel passing thereby for a distance sufficient for the stream of liquid to claims the entire wheel circumference. A flow control valve for regulating the flow of liquid is provided along with a sensor for detecting wheel position. A control mechanism regulates the movement of the manifold and the flow of pressurized liquid causing the manifold to move at a speed substantially equal to that of the vehicle. The method of operation in a specific linear actuator for translating the manifold is also disclosed.

17 Claims, 3 Drawing Sheets

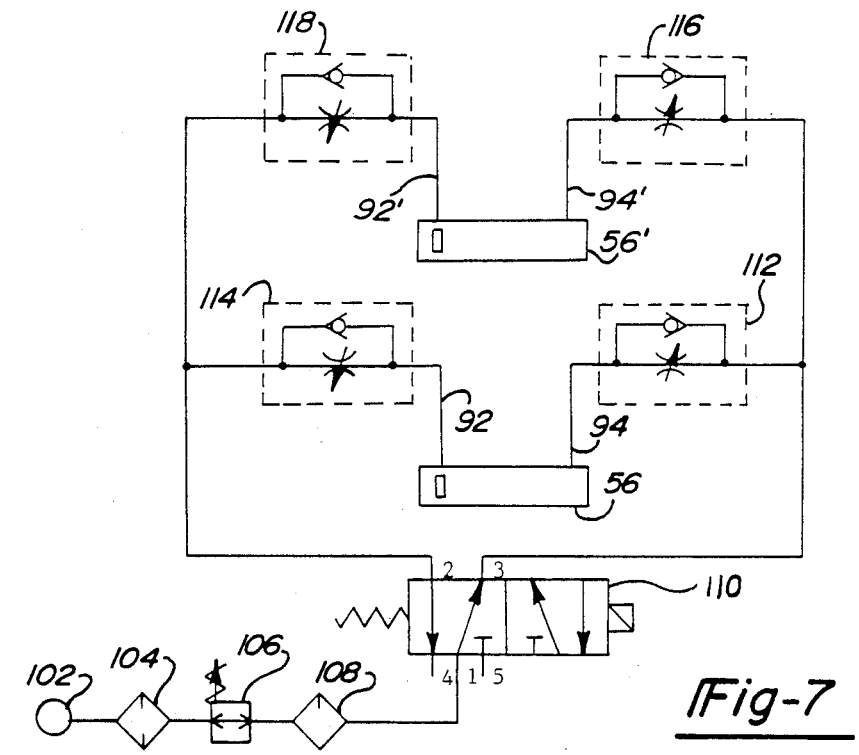
*Fig-7*
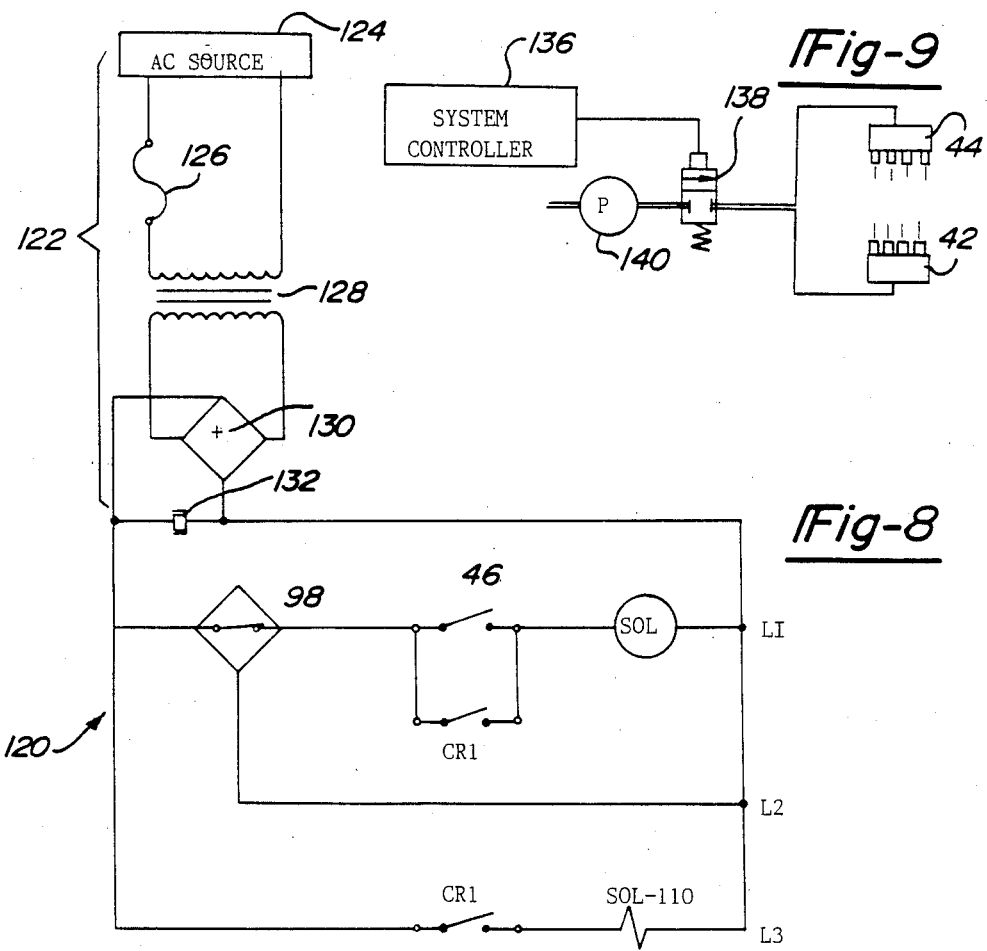
*Fig-9*
*Fig-8*

WHEEL WASHING APPARATUS AND METHOD

TECHNICAL FIELD

This invention relates to methods for washing vehicle wheels and apparatus therefor, and more particularly to wheel washing devices utilized in a drive-through washing system.

BACKGROUND ART

The cleaning of the wheels of a vehicle in a drive-through wash system has always been a difficult task to achieve automatically. While there have been numerous attempts to automatically wash vehicle wheels at a wheel cleaning station, the reliability and the cost of such devices have inhibited their general acceptance and usage in the industry. Today, most car washes have at least supplemented the washing of the vehicle wheels by manually spraying the vehicle wheels with a low pressure jet of water from a wand manipulated by one or more attendants.

Examples of prior art wheel washing devices are illustrated in the following U.S. Patents:

| | | |
|---|---|---|
| 2,716,772 | 09/06/55 | Cockrell |
| 2,857,921 | 10/28/58 | Hurst |
| 3,191,207 | 06/29/65 | VanBrakel |
| 3,628,212 | 12/21/71 | VanBrakel |
| 3,667,486 | 06/06/72 | Cole, et al |
| 3,670,743 | 06/20/72 | Moore |
| 3,679,134 | 07/25/72 | Nixon |
| 4,550,464 | 11/05/85 | Messing |
| 4,830,033 | 05/16/89 | Hanna |

The Messing Patent, U.S. Pat. No. 4,550,464, discloses a device which utilizes a rotating cleaning brush which engages and follows the wheel during a portion of its travel through a drive-through vehicle washing system. This device is expensive and very mechanically complicated and would have difficulty cleaning many of today's wire wheel covers or cast wheels having small deep recesses in which a brush could not effectively reach.

A more common approach utilized in the United States is to spray a low pressure, i.e. less than 100 PSI, stream of soapy water at the vehicle wheel in order to dislodge dirt and debris. The difficulty arises in effectively spraying the entire wheel surface in a relatively short segment of the drive-through washing system. As shown in U.S. Pat. Nos. 3,670,743, 3,667,486 and 3,679,134, Moore, Cole, et al and Nixon, respectively, others have attempted to utilize a spray of liquid to clean wheels which is provided by a plurality of longitudinally spaced apart and sequentially operated nozzles. In order to achieve coverage of the entire wheel circumference, the Nixon device mounts the liquid spray nozzles on rotating manifolds spaced transversely from the path of the vehicle.

The Hanna reference, U.S. Pat. No. 4,830,033, similarly shows a wheel washing apparatus using a series of sequentially activated nozzles. The Hanna nozzles provide a high pressure, 600 to 900 PSI, stream of liquid dispensed from a series of longitudinally spaced and sequentially activated nozzles. These nozzles are mounted atop a parallelogram type tire washing apparatus so that the nozzles can be spaced at a uniform distance from the vehicle wheel regardless of vehicle width.

U.S. Pat. Nos. 2,716,722, 3,191,207 and 3,628,212 cited above, disclose wheel washing systems which utilize pressurized liquid to clean the wheels of a vehicle while the wheels are being rotated at high speed on a series of rollers. By rotating the wheels at a speed faster than they would normally rotate passing through the drive-through vehicle wash, the wheels can be cleaned in a relatively short longitudinal distance. All three systems additionally longitudinally translate the manifolds supplying the liquid to the wheels to maintain the proper longitudinal alignment between the nozzles and the wheel. These three devices, along with the device shown in U.S. Pat. No. 2,857,921, Hurst, maintain the liquid manifold in proper longitudinal alignment with the vehicle wheel utilizing a roller follower which physically engages the leading edge of the wheel. The Hurst device additionally has a follower which engages the sidewall of the tire to enable the apparatus to be positioned transversely in uniform proximity to the vehicle wheel, respective of vehicle width.

DISCLOSURE OF INVENTION

An object of the present invention is to provide an efficient automatic wheel washing apparatus which can be installed in a drive-through washing system without adversely affecting the length of the conveyor.

Another object of the present invention is to provide a wheel washing apparatus which can be mounted on top of a conventional tire washing station of the type utilizing a parallelogram linkage for oriented an elongated brush carried by an elongated longitudinal beam adjacent the tire.

Another object of the present invention is to provide a wheel washing apparatus which can effectively clean the entire periphery of the wheel while the tire is in rolling engagement with the floor without utilizing a follower which mechanically engages the wheel/tire assembly.

Yet another object of the present invention is to provide a drive mechanism for longitudinally translating a liquid spring manifold which is compact, has a length substantially equal to the end to end displacement of the manifold and has all its working parts enclosed within a water resistant housing.

Accordingly, the wheel washing apparatus of the present invention is provided for use in a drive-through washing system in which a vehicle is moved along a longitudinal path across a floor surface at a predetermined speed by a conveyor passing by a series of washing stations. One of these stations includes a tire washing mechanism utilizing a parallelogram linkage for orienting an elongated brush carried by an elongated longitudinal beam adjacent to the tire of the vehicle regardless of width. The apparatus includes a manifold having a fluid inlet which is coupled to a source of pressurized liquid and an outlet nozzle in communication with the inlet for directing a stream of liquid at the vehicle wheel. A drive mechanism is provided which is mounted upon the tire washer longitudinal beam to translate the manifold longitudinally to follow the vehicle wheel as it passes by. The manifold is translated a sufficient longitudinal distance with the stream of liquid to clean the entire circumference of the wheel. A flow control valve for regulating the flow of pressurized liquid and a sensor for detecting the approach of a wheel is also provided. A control system regulates the drive mechanism in response to the sensor to move the manifold at a speed substantially equal to, but independent of the vehicle speed, to maintain the manifold generally adjacent the wheel during a wash cycle. At the conclusion of the wash cycle, flow is terminated and the manifold is retracted by the drive mechanism. A preferred mechanism utilizes a rodless cylinder which is affixed to the tire wash station elongated beam and is provided with an output member which carries the manifold longitudinally during the wheel wash cycle. The end to end length of the rodless cylinder is substantially equal to the end to end range of manifold motion enabling the rodless cylinder to be located in close proximity to the vehicle without interference.

These and other objects, features and advantages of the present invention will be apparent upon the review of the accompanying description of the preferred embodiment and drawings.

BRIEF DESCRIPTION OF THE DRAWINGS

FIG. 7 is a schematic illustration of the pneumatic system powering the rodless cylinders; and FIG. 8 is a schematic illustration of the electrical control system.

BEST MODE FOR CARRYING OUT THE INVENTION

Figure 1:
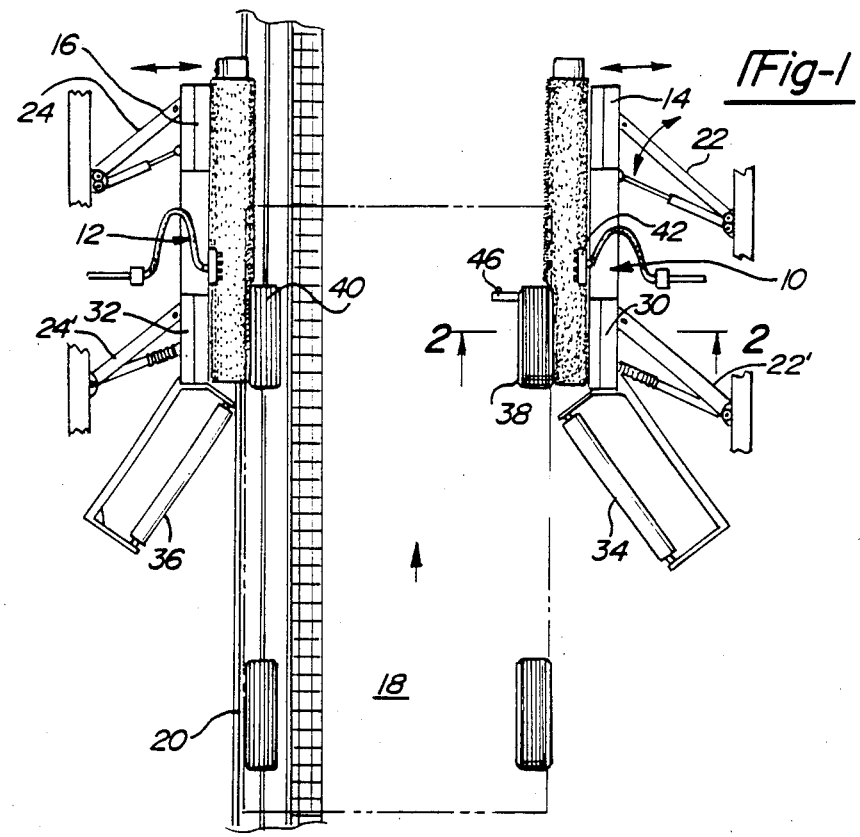
FIG. 1 is a plan view of a segment of a drive-through vehicle wash system illustrating a pair of wheel washing apparatus of the present invention in relationship to a vehicle.

The preferred embodiment of the invention is illustrated installed in a drive-through vehicle wash system in FIG. 1. A right and left wheel washing apparatus 10 and 12 are shown installed upon right and left tire washers 14 and 16. The tire washers 14 and 16 are oriented on the right and left side of the path of a vehicle 18 shown in phantom outline. The vehicle is illustrated within a drive-through vehicle washing system of the type in which the vehicle is moved along a longitudinal path by conveyor 20 which engages one of the left wheels of the vehicle in a conventional manner. Conveyor 20 is sufficiently wide to accommodate the widest conventional passenger car tire on the track therefor and is significantly wider than narrow tires frequently used by small cars.

In order to accommodate varying tire locations and the variety of vehicles that pass through the drive-through washing system, both the right and left tire washers 14 and 16 are provided with a parallelogram linkage 22 and 22', and 24 and 24' respectively, which orient right and left elongated brushes 26 and 28 in engagement with the vehicle tires. The elongated brushes 26 and 28 are pivotably affixed to elongated longitudinal beams 30 and 32 which are maintained in a general parallel relationship to the path of the vehicle by parallelogram links 22 and 24.

On the forward end of the right and left longitudinal beams 30 and 32 are follower rollers 34 and 36 respectively, which engage the front wheels of an approaching vehicle. Followers 34 and 36 outwardly bias the right and left longitudinal beams to properly position the brushes at the appropriate transverse spacing in order to engage the tire surface. It should be noted that the roller follower is returned to the initial inward most position after each vehicle passes through the tire wash station and automatically adjusts to the appropriate width of the next vehicle. The elongated brushes have a diameter of approximately eight inches and a length of eight to ten feet.

As the vehicle enters the tire wash station, the front bumper of the vehicle typically will project over the front end of the elongated brush and the longitudinal beam extending adjacent thereto. In order to avoid interference between the vehicle and the tire wash system, the elongated brush and the longitudinal beam must be relatively low profile so as to pass beneath the vehicle bumper.

As shown in FIG. 1, right and left wheel washing apparatus 10 and 12 are positioned generally centrally upon the elongated beam. Beams 30 and 32 are spaced several feet back from the front end of the longitudinal beam so that the front bumper of a wide vehicle does not strike the wheel washing apparatus. After the rear wheels of the vehicle clear the brush, it is desirable to return the brush to the center position to engage the next vehicle coming through the car wash system. It is therefor desirable to have the wheel washing apparatus set back several feet from the end of the brush so that the apparatus does not strike the vehicle. While it is possible to temporarily retain the brushes in the extended position to allow the vehicle time to clear the wheel washing apparatus, the quicker the apparatus can be returned, the less space between the vehicles in the system is needed.

From a cost standpoint, it is always desirable to fabricate vehicle washing systems which are as short as possible and have the highest possible vehicle through put rate. By minimizing the longitudinal length of the various wash stations, by conducting multiple wash operations simultaneously, and by minimizing the spacing between vehicles passing through the system, the optimum cost efficiency may be achieved.

In operation, after the vehicle progresses a few feet through the tire washing station, the vehicle wheels will approach the wheel washing apparatuses 10 and 12. In FIG. 1, right and left front wheels 38 and 40 are shown about to come into alignment with the wheel washing apparatus. The front tires of the vehicle have entered the tire washer and are engaged with the rotating right and left elongated brushes 26 and 28. At about this time, manifolds 42 and 44 begin to spray a high pressure stream of water at the wheel/tire assembly. As the vehicle continues to move forward, tire 38 engages treadle switch 46 which serves as a means for sensing the approach of the wheel. Manifolds 42 and 44 then begin to translate longitudinally at a speed substantially equal to that of the moving vehicle for a distance sufficient to clean the entire circumference of the wheel.

Figure 3:
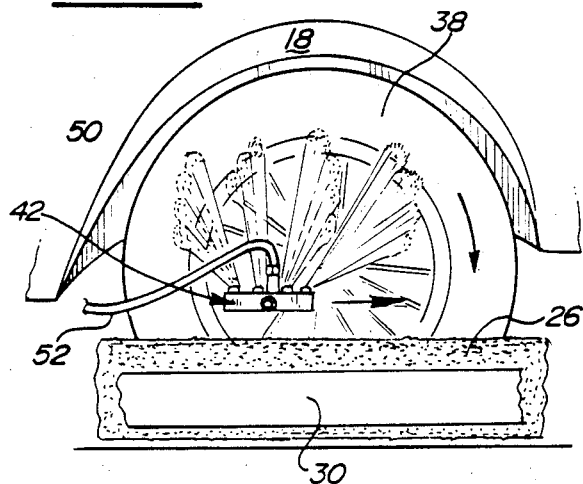
FIG. 3 is cross sectional side elevation taken along line 3—3 of FIG. 2.
Figure 2:
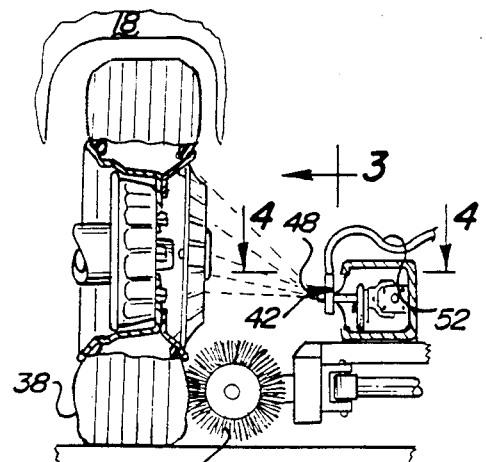
FIG. 2 is a cross sectional end view taken along line 2—2 of FIG. 1.

The orientation of the manifold 42 relative to the wheel tire assembly 38 and rotating brush 26 is illustrated in FIGS. 2 and 3. Since a substantial portion of the wheel will be masked by the rotating brush, the manifold is only able to spray a portion of the wheel surface area. As the manifold and vehicle move longitudinally together during the cleaning cycle, the wheel will have rotated sufficient that the entire circumference is clean.

In the embodiment illustrated, manifold 42 is provided with four adjustable orientation nozzles 48 which provide a fluid outlet. Manifold 42 also includes a fluid inlet 50, which is coupled to a source of pressurized liquid by flexible hose 52. After the manifold has completed its limited longitudinal travel, the manifold begins to retract. Shortly after completing the manifold travel, the spray of liquid from the manifold will be terminated.

In order to thoroughly clean the entire wheel surface, it is necessary to rotate the wheel 180 degrees during the cleaning process; and ideally, the wheel will be rotated 270-degrees. Since the water spray pattern impinging upon the wheel can include a very large radial segment, it is not necessary to design a system which will rotate the largest diameter wheel tire assemblies a full 360 degrees. Obviously, for a given longitudinal travel, smaller vehicle tires will rotate through a greater angle than a large diameter tire. A manifold travel of approximately 40 inches appears to be sufficient to adequately clean a wheel utilizing four nozzles in a horizontally elongated manifold. It is important to adjust the nozzles so that each radial segment of the wheel is cleaned.

Figure 4:
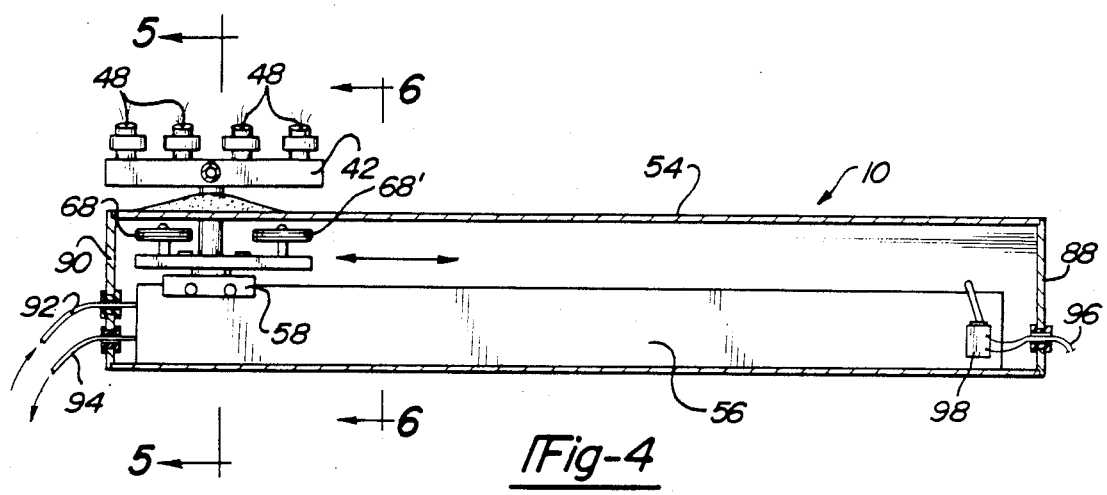
FIG. 4 is an enlarged cross sectional planned view taken along line 4—4 in FIG. 3.
Figure 5:
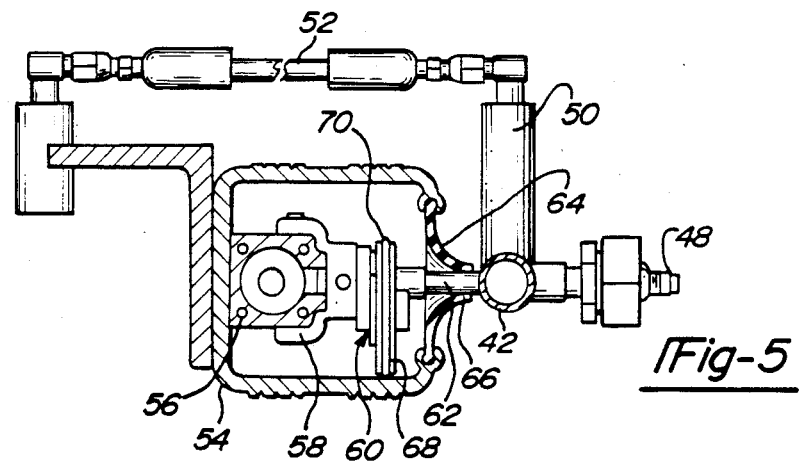
FIG. 5 is a cross sectional end view taken along line 5—5 of FIG. 4.

An enlarged drawing of the right wheel washing apparatus 10 is shown in FIG. 4 with housing 54 cut away to show the internal drive mechanism. Rodless cylinder 56 is affixed to housing 54 and is provided with output member 58 which translates longitudinally for a distance which significantly exceeds one-half the length of a rodless cylinder 56. Rodless cylinders of this type are generally well known and include cable cylinders, band cylinders and magnetic follower cylinders. Band type rodless cylinders made by Toll-o-matic Inc. have worked satisfactorily for this purpose. Carriage 60 is affixed to rodless cylinder output member 58 and includes a shaft portion 62 which extends transversely between flap seals 64 and 66 as shown in FIG. 5 to support manifold 42. In order to minimize the load exerted upon the rodless cylinder by the weight of the manifold and the reaction forces caused by the float spring, carriage 60 is provided with a pair of rollers 68 and 68' which ride upon the lower surface of housing 54 as shown in FIG. 5. In the preferred embodiment shown, rollers 68 and 68' each are provided with a rubber tire 70 which extends about the periphery thereof, to reduce noise and wear.

Flap seals 64 and 66 are generally parallel to one another and overlap slightly to enclose housing 54 and to keep out water and dirt particles. Shaft 62 extends between flap seals 64 and 66 as shown in FIG. 5, locally deflecting the seals. The seals are formed of a synthetic rubber material which is sufficiently flexible and resilient to withstand repeated usage. The flap seals of the preferred embodiment are formed of a plastic material of 64A durometer made by Monsanto, sold under the trademark, Stanopreme ®. The flap seals are extrusions having generally planar flap portions 72 and 74 which are cantileverly projecting from enlarged ribs 76 and 78 which extend the entire length of the seal.

Figure 6:
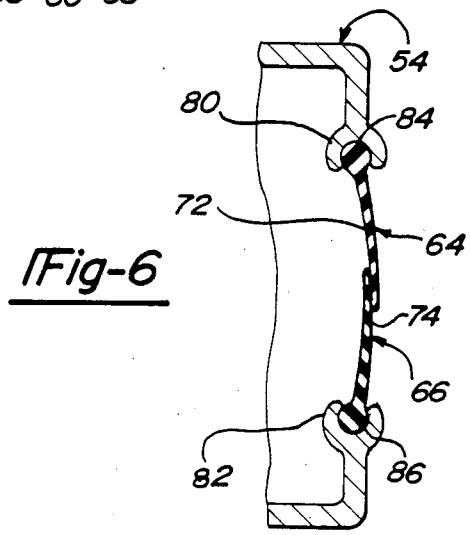
FIG. 6 is a partial cross sectional view illustrating the flap seal orientation at section 6—6 in FIG. 4.

In the preferred embodiment, housing 54 is formed of an aluminum extrusion of generally C-shaped cross section having an elongated slot formed therein between a pair of spaced apart transverse edge portions 80 and 82. Transverse edge portions 80 and 82 are provided with longitudinally extending grooves 84 and 86 which are sized to receive the rib 76 and 78 of flaps 64 and 66 respectively. Preferably grooves 84 and 86 sufficiently entrap rib 76 and 78 so that no fasteners are necessary to affix or locate the flap seals. As illustrated in FIGS. 5 and 6, flap seals may be telescopically inserted within grooves 84 and 86 formed in a housing 54. During insertion, a lubricant may be helpful.

As illustrated in FIG. 4, housing 54 is preferably provided with end caps 88 and 90 to substantially enclose the housing. The rodless cylinder can thereby be substantially isolated from the vehicle wash environment which is external of the housing. Fluid input and output lines 92 and 94 which supply fluid necessary to operate the rodless cylinder sealingly extend through end cap 90 as shown. Wire 96 sealingly extends through end cap 88 and is connected to proximity transducer 98. Proximity transducer 98 is affixed to rodless cylinder 56 and is oriented to sense output member 58 reaching its full travel position. Preferably, proximity transducer 98 is of the contactless type so as to not be affected by wear and corrosion.

A rodless cylinder 56 of the type utilized in the preferred embodiment is pneumatically powered in both the cleaning and the retract direction. A schematic illustration of the pneumatic circuit is shown in FIG. 7. Rodless cylinders 56 and 56' provide a drive means for the right and left manifolds. Input/output ports 92 and 94, 92' and 94' couple to each of the variable displacement internal cavities within rodless cylinders 56 and 56', respectively. By varying the relative pressure supplied to input/output ports 92 and 94, the internal piston within the rodless cylinder 56 to which the manifold is affixed, may be translated linearly.

Pneumatic circuit 100 is made up of a source of pressurized air 102, filter 104, pressure regulator 106 and lubricator 108, which together provide a source of clean, lubricated constant pressure air. Control valve 110 is a two-position solenoid operated pneumatic valve which alternatively connects input/output ports 92 and 94 to pressurized air or to atmosphere. When the valve is in the position illustrated in FIG. 7, fluid line 94 is pressurized and line 92 is vented to atmosphere, causing the manifold to shift to the start position. When the solenoid is energized, the valve shifts pressurizing fluid line 92 and venting line 94 to atmosphere, causing the manifold to translate longitudinally. When the manifold travel is complete, control valve 110 shifts to the position shown in FIG. 7 causing the manifold to retract. In order to control the speed of each of the two rodless cylinders in the advance and the retract direction, four variable orifices 112, 114, 116 and 118 are provided as shown in FIG. 7. Each of the variable orifices are provided with an internal check valve oriented in parallel with the orifices so that flow is only restricted in the exhaust direction.

The electrical circuit 120 for controlling solenoid operated valve 110 is illustrated in FIG. 8. A power supply point circuit 122 is created by AC source 124, fuse 126, transformer 128, rectifier bridge 130 and compacitor 132. A simple ladder logic wiring diagram is illustrated that works satisfactory, however, it should be noted that there are numerous other alternative electrical circuits which could perform the same function. Control relay CR1 has a coil and a switch portion illustrated schematically in FIG. 8. Control relay switch and treadle switch 46 are normally open and provide alternative electrical paths in line L1 of the ladder logic diagram. Also in line L1, completing the circuit, is proximity switch 98, which is normally closed, and the control relay coil CR1. The proximity switch 98 is also provided with a ground lead illustrated in ladder line L2. When the tire of the vehicle rolls over treadle switch 46, the switch is closed causing the control relay coil CR1 to energize and control relay switches CR1 to close. Once treadle switch 46 closes, the control relay will remain energized until the manifold has completed its full washing cycle and proximity switch 98 is opened. With control relay switch CR1 closed, the circuit in ladder line L3 is completed, energizing solenoid SOL-110 and shifting the valve 110 from the retract position shown in FIG. 7 to the cleaning position.

Since it is not as important to control the precise start and finish of the water flow to a pair of manifolds, a simple water flow circuit is utilized which is controlled by the conveyor controller 136. The preferred embodiment of the invention illustrated is used in conjunction with a modern drive-through wash system having an electronic system controller 136. This controller knows generally the position of each car within the wash system at all times. The system controller is used to control water flow, eliminating the need for yet another pair of treadle switches. The system controller operates a simple solenoid activated valve 138 illustrated in FIG. 9 which regulates the flow of liquid from a high pressure pump 140 to manifolds 42 and 44. Alternatively, the system controller can simply turn the pump on and off to regulate flow. In the preferred embodiment of the invention illustrated, pump 140 provides high pressure water as a cleaning medium in the 600 to 1000 PSI range. Since the nozzles for water of this pressure must be of a very small diameter, fresh water is utilized as opposed to reclaimed water to avoid nozzle clogging and problems associated with dirt and debris in reclaimed water. It should be noted, however, that a lower pressure system using reclaim water and large diameter nozzles will also work satisfactorily and whether a high or low pressure system will be utilized will vary upon the needs of the particular wash system operator.

While the preferred embodiment of the invention utilizes a manifold for spraying high pressure liquid at the vehicle wheels for cleaning, the invention can also be adapted by those skilled in the art to carry alternative cleaning means for applying liquid to at least one portion of the wheel/tire assembly moving through the wash system. Alternatively, a small rotating brush could be used to apply liquid to the wheel and/or tire during a cleaning operation. It should also be noted that while the preferred embodiment of the invention is mounted to a preexisting parallelogram linkage of a tire washer, in certain circumstances it may be appropriate to mount the present wheel/tire washer mechanism upon its own parallelogram linkage.

Not only is the apparatus novel, but the method of washing wheels utilizing the previously described apparatus is likewise novel. The method is utilized in a drive-through vehicle washing system in which the vehicle is moved along a longitudinal path across a floor surface at a predetermined speed by a conveyor. The vehicle passes by a series of washing stations, including a car washing station of a type using a parallelogram linkage for orienting an elongated brush carried by an elongated longitudinal beam adjacent the tire of the vehicle having an unknown width. A manifold coupled to a source of pressurized liquid sprays a stream of liquid at the vehicle wheel. The manifold is shiftable transversely in a spaced apart relationship to the vehicle wheel along a path generally parallel to the vehicle path.

The wheel washing apparatus is automatically positioned by the tire washer in a spaced apart relation to the vehicle tire. The approach of the wheel is sensed and liquid is automatically dispensed by the manifold to engage a portion of the vehicle wheel. The rodless cylinder is automatically translated in response to the sensing of the approach of the vehicle wheel to cause a manifold to translate at a uniform speed which is substantially equal to, but independent of the vehicle speed, a distance sufficient to clean the entire wheel periphery. The manifold is then retracted to await the approach of the next wheel to be cleaned.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed:

1. A wheel washing apparatus for use in a drive-through vehicle washing system in which a vehicle is moved along a longitudinal path across a floor at a predetermined speed by a conveyor to pass by a series of washing stations including a tire wash station of the type utilizing a parallelogram linkage for orienting an elongated brush carried by an elongated longitudinal beam adjacent the tire of a vehicle having an unknown width, said wheel washing apparatus comprising:

a manifold having a fluid inlet coupled to a source of pressurized liquid and an outlet nozzle in communication therewith for directing a stream of liquid at the vehicle wheel;

a flow control valve for regulating the supply of pressurized liquid to the manifold inlet;

drive means for mounting the manifold upon the tire washer longitudinal beam to translate the manifold longitudinally to follow a vehicle wheel passing thereby for a distance sufficient for the stream of liquid to clean the entire circumference of the wheel;

sensor means for sensing the approach of a wheel; and control means for controlling the drive means and the flow control valve in response to the sensor means to initiate liquid flow and to move the manifold at a speed substantially equal but independent of the vehicle speed to maintain the manifold generally adjacent the wheel for a wash cycle, and to terminate the flow of liquid and to cause the drive means to retract the first manifold at the end of the wash cycle.

2. The apparatus of claim 1 wherein said drive means further comprises a rodless cylinder having an output member which is affixed to the manifold, said output member having a travel which is substantially greater than one-half of the overall rodless cylinder length.

3. The apparatus of claim 2 further comprising a housing generally surrounding the elongated cylinder and having an elongated longitudinal slot formed therein which is sealed by a flexible flap seal to define an enclosed region substantially isolated from the vehicle wash environment.

4. The apparatus of claim 1 wherein said overall length of the rodless cylinder is significantly less than the length of the tire wash elongated longitudinal beam.

5. The apparatus of claim 3 wherein said rodless cylinder is longitudinally spaced rearwardly from the leading edge of the elongated longitudinal beam to prevent interference with a vehicle entering the tire washer station.

6. The apparatus of claim 1 wherein said manifold further comprises a generally horizontal elongated member having a plurality of longitudinally spaced apart adjustable orientation nozzles affixed thereto.

7. The apparatus of claim 1 wherein the drive means includes a linear actuator for cyclically translating the manifold, said linear actuator comprising:
   a generally C-shaped elongated housing having a pair of spaced apart longitudinal edge portions defining an elongated slot therebetween, each of said edge portions being provided with a longitudinally extending groove;
   a pair of elongated flap seals each having an edge portion for cooperating with the elongated grooves in the C-shaped housing edge portions, a flap portion freely projecting therefrom, said edge portions overlapping one another to cover the elongated slot in the C-shaped housing;
   a rodless cylinder oriented within the C-shaped housing and affixed relative thereto, said rodless cylinder having an output member which is shiftable longitudinally along an axis generally parallel to the elongated slot in the c-shaped housing;
   a cantilever arm member affixed to said rodless cylinder output member and extending outwardly therefrom projecting between and elastically deforming the pair of flap seals locally adjacent the cantilever arm, said cantilever arm having a free end adapted to be affixed to the manifold; and
   a pair of end caps affixed to the ends of the C-shaped channel to define an enclosed region substantially isolated from the vehicle wash environment external thereto.

8. The apparatus of claim 7 further comprising a carriage affixed to the rodless cylinder output member and slidably engaging the C-shaped elongated housing to reduce the load exerted upon the rodless cylinder by the cleaning apparatus supported thereby.

9. The apparatus of claim 7 wherein said rodless cylinder further comprises a band cylinder having an overall length substantially less than two times the distance traveled by the output member.

10. A wheel washing apparatus for use in a drive-through vehicle washing system in which a vehicle is moved along a longitudinal path across a floor at a predetermined speed by a conveyor to pass by a series of washing stations including a tire was station of the type utilizing a parallelogram linkage for orienting an elongated brush carried by an elongated longitudinal beam adjacent the tire of a vehicle having an unknown width, said wheel washing apparatus comprising:
   a manifold having a fluid inlet coupled to a source of pressurized liquid and an outlet nozzle in communication therewith for directing a stream of liquid at the vehicle wheel;
   a flow control valve for regulating the supply of pressurized liquid to the manifold inlet;
   a rodless cylinder generally centrally affixed to the tire wash elongated beam and, extending therealong for a distance substantially less than the length of the beam, said rodless cylinder having an output member to which the manifold is affixed to translate the manifold longitudinally for a limited distance in spaced apart parallel alignment with the wheel of a vehicle, passing through the washing system;
   sensor means for sensing a wheel location; and
   control means controlling the flow control valve and regulating the movement of the rodless cylinder in response to the sensor means to initiate liquid flow and to move a manifold to maintain the manifold generally adjacent the vehicle wheel for a wash cycle for a distance sufficient to clean the entire wheel circumference and to automatically retract the manifold at the conclusion of the wash cycle to await the approach of another wheel.

11. The apparatus of claim 10 wherein said control means causes the manifold to move at a speed which is substantially equal to, but independent of, the motion of the vehicle.

12. The apparatus of claim 11 further comprising a housing generally surrounding the elongated cylinder and having an elongated longitudinal slot formed therein, which is sealed by a flexible flap seal to define an enclosed region substantially isolated from the vehicle wash environment.

13. The apparatus of claim 10 wherein said rodless cylinder further comprises a band cylinder which has a length substantially less than two times the distance traveled by the output member.

14. The apparatus of claim 10 wherein said overall length of the rodless cylinder is significantly less than the length of the tire wash elongated longitudinal beam.

15. A cleaning apparatus for treating a portion of a wheel/tire assembly of a vehicle being cleaned in a vehicle wash system of the type in which a vehicle is moved along a longitudinal path across a floor at a predetermined speed by a conveyor to pass by a series of stations, said apparatus comprising:
   cleaning means for applying liquid to at least one portion of a wheel/tire assembly on a vehicle moving through a wash system;
   a parallelogram mechanism affixed to the floor adjacent the path of the vehicle for engaging the tire of the vehicle to automatically position a longitudinal member adjacent the wheel of the vehicle for vehicles having various widths;
   a fully powered rodless cylinder generally centrally fixed to the parallelogram longitudinal member and having an output member affixed to the cleaning means for longitudinally translating the cleaning means in spaced apart relation to the vehicle wheel tire assembly for a distance sufficient to apply liquid to the entire circumference of the wheel/tire assembly portion;
   sensor means for sensing the approach of a wheel/tire assembly; and
   control means for controlling the fluid powered rodless cylinder and the cleaning means in response to the sensing means to initiate the cleaning cycle and to move the cleaning means at a speed substantially equal to that of a vehicle wheel/tire assembly for a cleaning cycle, and retracting the rodless cylinder upon the completion of the cleaning cycle.

16. The apparatus of claim 15 wherein said cleaning means further comprises a manifold having a fluid inlet coupled to a source of pressurized liquid and an outlet nozzle in communication therewith for directing a stream of liquid at the vehicle wheel.

17. The apparatus of claim 12 wherein said control means causes the manifold to move at a speed substantially equal to, but independent of, that of the vehicle.

* * * * *

UNITED STATES PATENT AND TRADEMARK OFFICE
CERTIFICATE OF CORRECTION

PATENT NO. : 4,985,957
DATED : January 22, 1991
INVENTOR(S) : Michael J. Belanger et al.

It is certified that error appears in the above-identified patent and that said Letters Patent is hereby corrected as shown below:

```
Column 9, line 1, Claim 5,
          "3" should be --4--;

Column 10, line 64, Claim 17,
          "12" should be --15--.
```

Signed and Sealed this

Thirty-first Day of August, 1993

Attest:

BRUCE LEHMAN

Attesting Officer   Commissioner of Patents and Trademarks